(12) United States Patent
Manna et al.

(10) Patent No.: US 11,525,241 B2
(45) Date of Patent: Dec. 13, 2022

(54) HYDRAULIC SHOVEL

(71) Applicant: Caterpillar SARL, Geneva (CH)

(72) Inventors: Niladri Manna, Akashi (JP); Shigeo Kajita, Akashi (JP); Kazushige Okamoto, Akashi (JP)

(73) Assignee: Caterpillar SARL, Geneva (CH)

( * ) Notice: Subject to any disclaimer, the term of this patent is extended or adjusted under 35 U.S.C. 154(b) by 372 days.

(21) Appl. No.: 16/638,591

(22) PCT Filed: Aug. 22, 2018

(86) PCT No.: PCT/EP2018/072702
§ 371 (c)(1),
(2) Date: Feb. 12, 2020

(87) PCT Pub. No.: WO2019/038347
PCT Pub. Date: Feb. 28, 2019

(65) Prior Publication Data
US 2021/0363725 A1 Nov. 25, 2021

(30) Foreign Application Priority Data
Aug. 24, 2017 (JP) .............................. JP2017-160826

(51) Int. Cl.
*E02F 9/08* (2006.01)
*B60K 15/063* (2006.01)

(52) U.S. Cl.
CPC .......... *E02F 9/0883* (2013.01); *B60K 15/063* (2013.01); *E02F 9/0833* (2013.01); *B60Y 2200/411* (2013.01)

(58) Field of Classification Search
CPC .... E02F 9/0883; E02F 9/0833; B60K 15/063; B60Y 2200/411
See application file for complete search history.

(56) References Cited

U.S. PATENT DOCUMENTS

| | | | |
|---|---|---|---|
| 2009/0084004 A1* | 4/2009 | Kim ...................... | E02F 9/0833 224/539 |
| 2009/0133297 A1* | 5/2009 | Lee .......................... | E02F 9/00 37/443 |

(Continued)

FOREIGN PATENT DOCUMENTS

| | | | |
|---|---|---|---|
| CN | 103930626 | 7/2014 | |
| DE | 112013000105 T5 * | 11/2014 | .............. B60T 1/062 |

(Continued)

OTHER PUBLICATIONS

International Search Report for related International Application No. PCT/EP2018/072702; report dated Nov. 6, 2018.

*Primary Examiner* — Jacob B Meyer

(57) ABSTRACT

In a hydraulic shovel including a crawler-type lower traveling body and a storage box provided at the front side of the right side of an upper rotating body, the upper face of the crawler has a stable space that can be used as a scaffold for a worker or as a temporary storage space such as a supply tank. The storage box has, at the front side of the right side, a notch that is obliquely cut from the upper side of the inner end in the left-and-right direction of the crawler to the rear side of the left and right outer sides. The notch has, at the lower side thereof, the upper face of the crawler that provides a space S usable as a scaffold for a worker or as a temporary storage space.

5 Claims, 6 Drawing Sheets

(56) References Cited

U.S. PATENT DOCUMENTS

| | | | |
|---|---|---|---|
| 2017/0211255 A1 | 7/2017 | Ozaki | |
| 2021/0363725 A1* | 11/2021 | Manna | ................. E02F 9/0833 |

FOREIGN PATENT DOCUMENTS

| | | | | |
|---|---|---|---|---|
| EP | 2045399 | A2 | 4/2009 | |
| EP | 2829663 | A1 * | 1/2015 | ............... B60R 3/00 |
| JP | 2001180381 | A * | 7/2001 | ............ E02F 9/0833 |
| JP | 2001234558 | A * | 8/2001 | ............ E02F 9/0833 |
| JP | 2004143887 | A | 5/2004 | |
| JP | 2004143887 | A * | 5/2004 | ............ E02F 9/0833 |
| JP | 2004-190276 | A | 7/2004 | |
| JP | 2004190276 | A * | 7/2004 | |
| JP | 2009138395 | A * | 6/2009 | ............ E02F 9/0833 |
| JP | 2016135975 | A | 7/2013 | |
| JP | 2015040418 | A | 3/2015 | |
| JP | 2016-223198 | A | 12/2016 | |
| KR | 20090034102 | A * | 4/2009 | |
| KR | 20090040933 | A * | 4/2009 | |
| KR | 20100090451 | A * | 8/2010 | |
| KR | 20110046856 | A * | 5/2011 | |
| WO | WO-2008065894 | A1 * | 6/2008 | ............ B62D 25/10 |
| WO | WO-2011033732 | A1 * | 3/2011 | ............ B60K 13/04 |
| WO | WO-2012172903 | A1 * | 12/2012 | ............ B60K 13/04 |
| WO | WO-2013069628 | A1 * | 5/2013 | ................ E02F 9/08 |
| WO | WO-2015007893 | A1 * | 1/2015 | ............ B60R 3/005 |
| WO | WO 2015/025002 | A | 2/2015 | |
| WO | WO-2015025002 | A1 * | 2/2015 | ............ B60R 3/005 |
| WO | WO-2015053273 | A1 * | 4/2015 | ............ B60K 13/04 |
| WO | WO-2017154188 | A1 * | 9/2017 | ............ B60K 11/04 |
| WO | WO-2018055887 | A1 * | 3/2018 | ................ B60R 1/00 |
| WO | WO-2018209284 | A1 * | 11/2018 | ................ B60R 3/02 |
| WO | WO-2019038347 | A1 * | 2/2019 | ............ B60K 15/063 |
| WO | WO-2019049787 | A1 * | 3/2019 | ................ E02F 9/24 |
| WO | WO-2019117195 | A1 * | 6/2019 | ........... B60K 15/035 |

* cited by examiner

HYDRAULIC SHOVEL

CROSS-REFERENCE TO RELATED APPLICATION

This Application is a 35 USC § 371 US National Stage filing of International Application No. PCT/EP2018/072702 filed on Aug. 22, 2018 which claims priority under the Paris Convention to Japanese Patent Application No. 2017-160826 filed on Aug. 24, 2017.

TECHNICAL FIELD

The present invention relates to the technical field of a hydraulic shovel including a crawler-type lower traveling body.

BACKGROUND ART

Generally, an upper rotating body of a hydraulic shovel has thereon various devices and apparatuses such as an engine, a hydraulic pump, a fuel tank, a hydraulic oil tank, or a cooling device. In the case of a large hydraulic shovel in particular, when these devices and apparatuses are subjected to an operation such as maintenance, the devices and apparatuses cannot be directly accessed from the ground. In such a case, a worker must get on the upper rotating body to perform an operation such as maintenance. In recent years, a hydraulic shovel including an exhaust gas treatment apparatus using urea water has been provided. In the case of such hydraulic shovel, if an operation to provide the supply to a urea water tank cannot be carried out from the ground, the supply operation must be performed on the upper rotating body (see Patent Literature 1 for example).

One of the conventionally-known structures to allow the worker to access the upper rotating body in order to perform operations such as maintenance or supply as described above is configured so that a storage unit is provided at the front side of the right side of the upper rotating body and an upper face of the storage unit is used as a part of a path to get on or get off the upper face of the upper rotating body from the ground (see Patent Literatures 1 and 2 for example). In this case, the structure disclosed in Patent Literature 1 has, as the storage unit provided at the front side of the right side of the upper rotating body, the third container to store a urea water tank and the second container positioned at the front side of the third container and at the front end of the upper rotating body. These second and third containers have the upper faces used as a stair to get on the upper rotating body. The second container has the upper face to allow the worker to get on the structure to perform a supply operation to the urea water tank. The structure disclosed in Patent Literature 2 is configured so that a treatment agent tank cover covering the urea water tank (treatment agent tank) has, at the front side thereof, a tool box and the tool box has steps at the front side thereof so that these steps, the upper face of the tool box, and the upper face of the treatment agent tank cover can be used as a stair to get on the upper rotating body.

PRIOR ART LITERATURES

Patent Literatures

[Patent Literature 1] Japanese Unexamined Patent Application Publication No. 2016-223198

[Patent Literature 2] Japanese Unexamined Patent Application Publication No. 2016-135975

SUMMARY OF THE INVENTION

Problems to be Solved by the Invention

In the case of the structure as disclosed in Patent Literatures 1 and 2 as described above, the storage unit is provided at the front side of the right side of the upper rotating body and the upper face of the storage unit is used as a part of a platform path to get on or get off the upper face of the upper rotating body from the ground. This structure requires the worker to firstly get on the upper face of the storage unit from the ground. In this case, the worker must get on the upper face of the storage unit from the ground while carrying baggage such as a maintenance tool or a supply tank, which causes instability. Thus, there is a demand to temporarily place the baggage on the upper rotating body (e.g., on the upper face of the third container in Patent Literature 1 or on the upper face of a catwalk in Patent Literature 2) or on the upper face of the crawler. However, in the case of a large hydraulic shovel in particular, the upper rotating body has high ground height, which makes it difficult to directly place the baggage on the upper rotating body from the ground. On the other hand, the upper face of the crawler frequently has lower ground height than that of the upper rotating body and thus can be reached by a hand in many cases. However, when the front-and-rear direction of the upper rotating body is in the same direction as the front-and-rear direction of the crawler, the upper face of the crawler is mostly covered by the upper rotating body, which makes it difficult to provide a space in which the baggage can be placed. At a part protruding from the front end of the upper rotating body, the upper face of the crawler is not covered by the upper rotating body and a space to place the baggage can be provided. However, the upper face of the crawler at a part protruding from the front end of the upper rotating body has the crawler is disconnected from the support by upper roller and is opposed to an idler and is downwardly inclined in the front direction. This causes a disadvantage of preventing the baggage from being placed stably.

Furthermore, in the structure disclosed in Patent Literature 1, the upper face of the second container provided at the front end of the upper rotating body is used as a workshop to perform a supply operation to the urea water tank stored in the third container. However, if the second container has an upper face having a small area, the operation is difficult to be performed and, if the second container has an upper face having a large area, the third container has a proportionally-reduced area, which is disadvantageous.

The structure disclosed in Patent Literature 2 is configured so that the step provided at the front side of the storage unit (tool box) is used as a scaffold to get on the upper face of the storage unit. However, in order to allow the worker to get on the upper face of the storage unit via the step at the front side of the storage unit, the worker must firstly get on the upper face of the crawler at a part protruding from the front end of the upper rotating body. However, the upper face of the crawler at a part protruding to the front side from the front end of the upper rotating body is downwardly inclined in the front direction as described above. Thus, when the worker carries baggage such as a tool or a supply tank in particular, a risk is caused where the worker must walk unsteadily.

One of large hydraulic shovels has, as in the structure disclosed in Patent Literature 2, catwalks at the left and right side faces of the upper rotating body. However, the structure disclosed in Patent Literature 2 is not configured so that the upper face of the storage unit or the step provided at the front side of the storage unit is not continuously provided with the catwalks. This requires the worker, in order to walk between the catwalks and the upper face of the storage unit, to get off to the upper face of the crawler, which disadvantageously causes a declined working efficiency. The present invention intends to solve these disadvantages.

MEANS FOR SOLVING THE PROBLEM

In view of the situation as described above, the present invention has been made for the purpose of solving these disadvantages. The invention of claim 1 provides a hydraulic shovel, comprising: a lower traveling body having left and right crawlers; an upper rotating body that has a rotating frame constituting a supporting structure and that is rotatably supported by the lower traveling body; and a storage box provided at the front side of one of the left and right sides of the upper rotating body. The hydraulic shovel is configured so that the upper face of the storage box can be used as a platform path to get on or get off the upper face of the upper rotating body from the ground. When the storage box and the rotating frame at the lower side of the storage box are provided, at the front side of the outer side in the left-and-right direction, so that the front-and-rear direction of the upper rotating body is in the same direction as the front-and-rear direction of the crawler, a notch is provided that is obliquely cut from the upper side of the inner end in the left-and-right direction of the crawler to the rear side of the left and right outer sides. The notch has, at the lower side thereof, the upper face of the crawler that is used as a space usable as a scaffold for a worker or a temporary storage space. The storage box is configured to include a front face that is parallel to the left-and-right direction of the upper rotating body and that has an outer side end in the left-and-right direction provided at the upper side of the inner end in the left-and-right direction of the crawler; an inclined face obliquely extending from the outer side end in the left-and-right direction of the front face to the rear side of the left and right outer sides to form the notch; and outer side face in the left-and-right direction that are parallel to the front-and-rear direction of the upper rotating body and that rearwardly extend from the outer side end in the left-and-right direction of the inclined face. A platform scaffold to get on or get off the upper face of the storage box is provided at a rotating frame positioned at the inclined face or the outer side face in the left-and-right direction of the storage box or at the lower side of the inclined face or the outer side face in the left-and-right direction.

According to the invention of claim 2, the hydraulic shovel according to claim 1 is configured so that the hydraulic shovel has, on an outer side face at one of the left and right sides of the upper rotating body, a catwalk extending in the front-and-rear direction. A platform scaffold is provided at the rotating frame positioned at the lower side of the inclined face or the outer side face in the left-and-right direction of the storage box so that the platform scaffold is continuously provided with the catwalk.

Favorable Effects of the Invention

According to the invention of claim 1, the upper face of the crawler at the lower side of the notch of the storage box can be used as stable scaffold or temporary storage space and the reduced capacity due to the storage box including the notch can be minimized. Furthermore, the worker can get on or get off the upper face of the storage box in a steady manner.

According to the invention of claim 2, the worker can move between the catwalk and the upper face of the storage box in an easy and efficient manner.

DETAILED DESCRIPTION OF THE INVENTION

The following section will describe an embodiment of the present invention with reference to the drawings.

Figure 1:
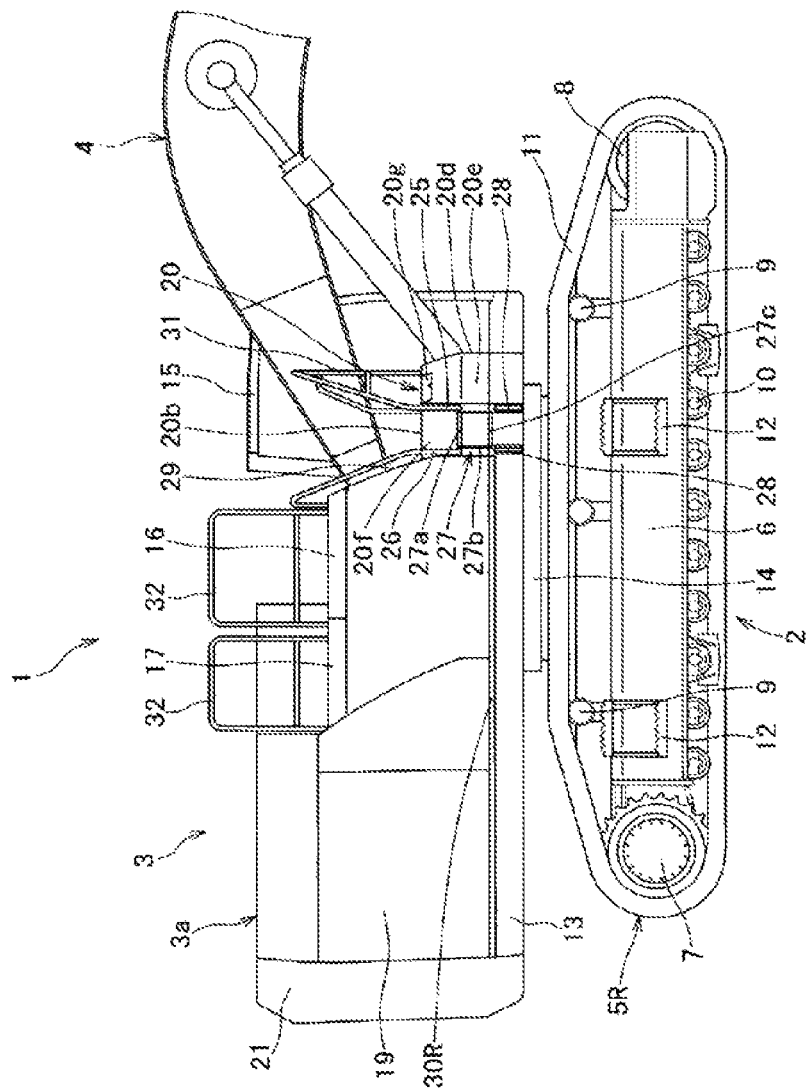
FIG. 1 is a right-side view illustrating a hydraulic shovel showing the first embodiment.
Figure 2:
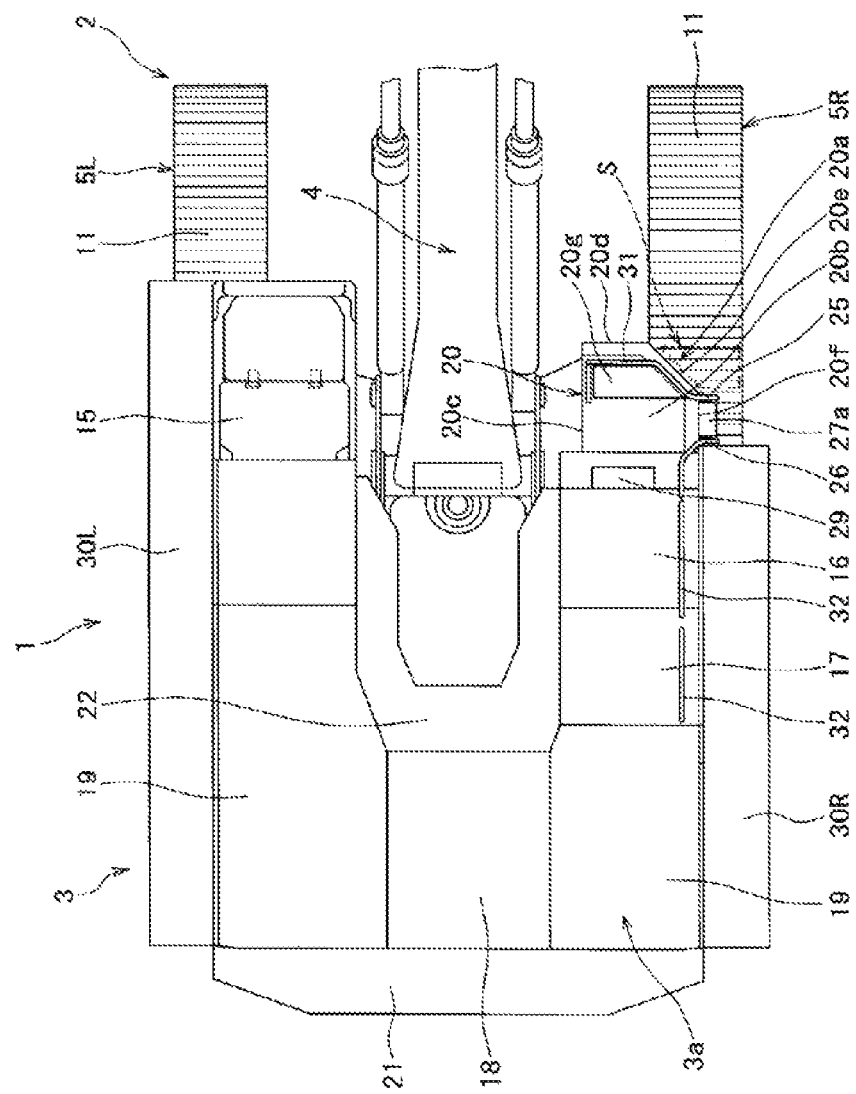
FIG. 2 is a plan view illustrating the hydraulic shovel showing the first embodiment.
Figure 3:
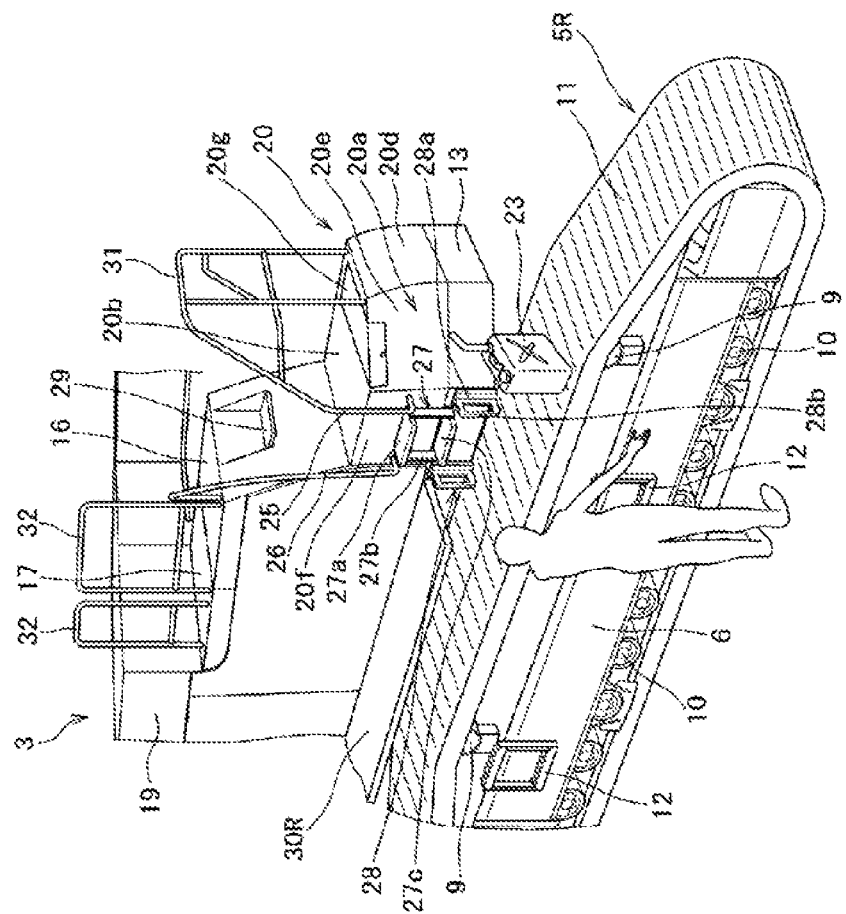
FIG. 3 is a perspective view illustrating the main part showing the first embodiment.
Figure 4:
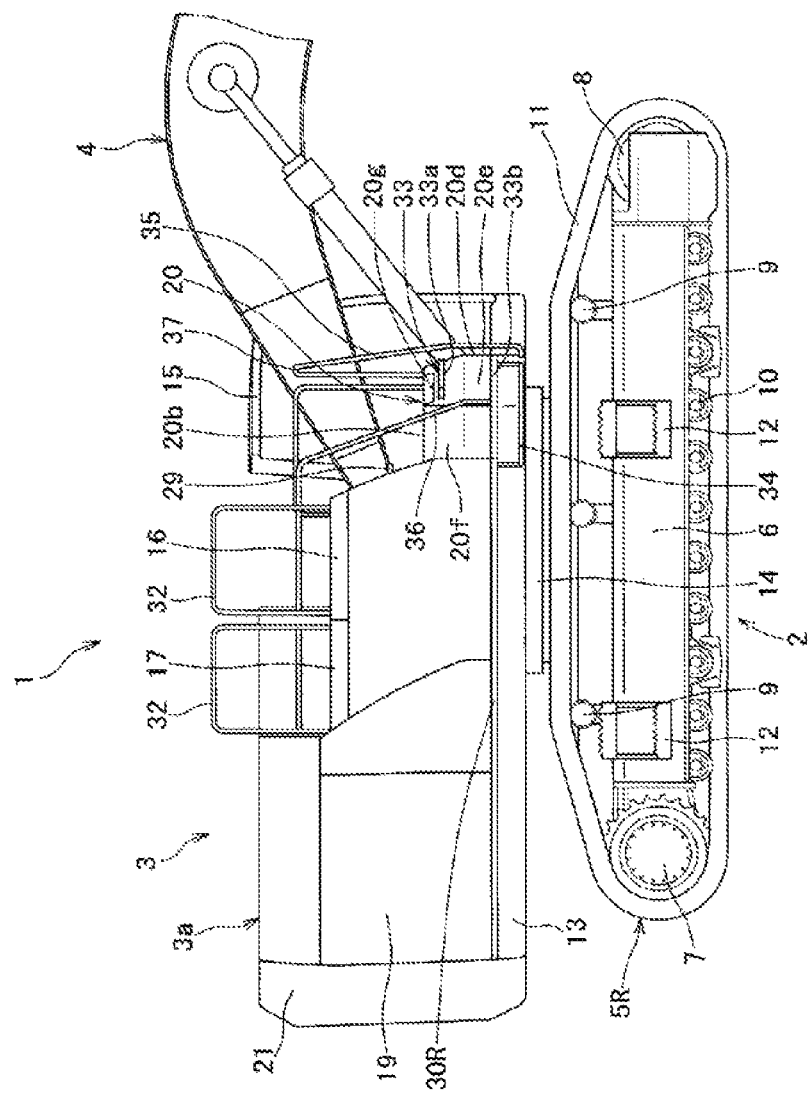
FIG. 4 is a right-side view illustrating the hydraulic shovel showing the second embodiment.
Figure 5:
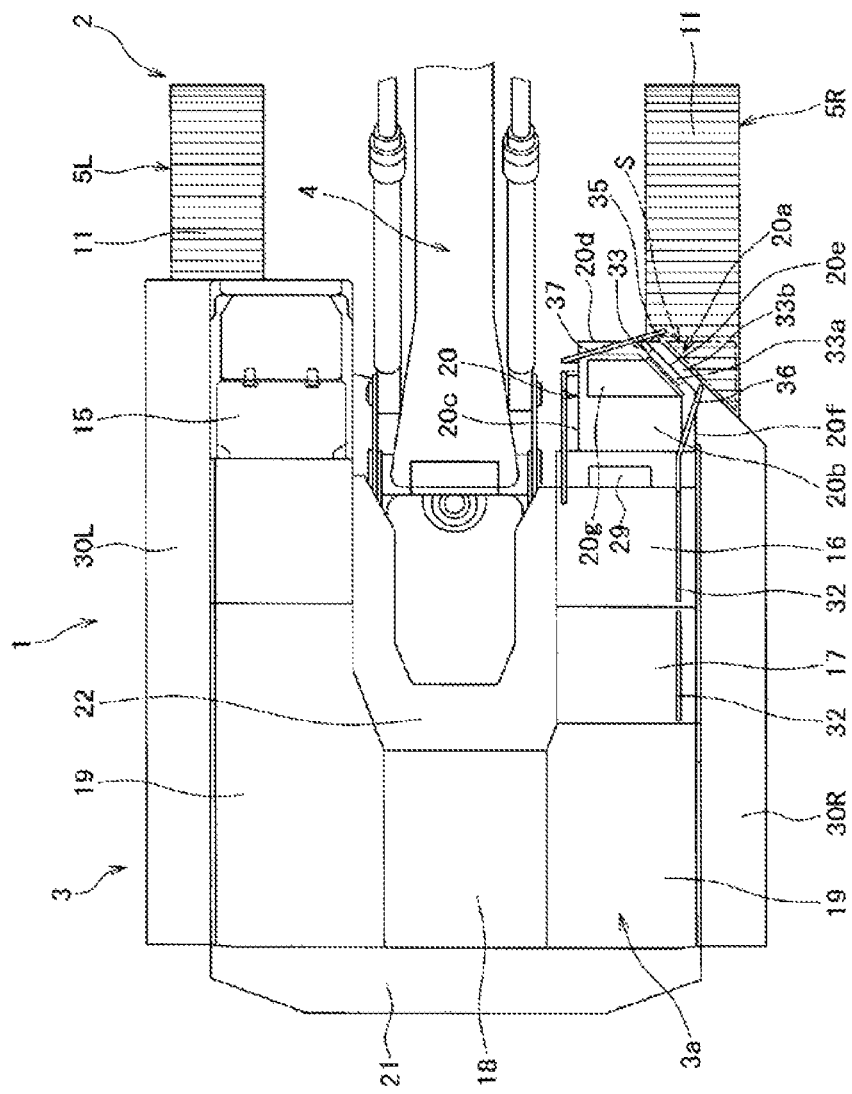
FIG. 5 is a plan view illustrating the hydraulic shovel showing the second embodiment.
Figure 6:
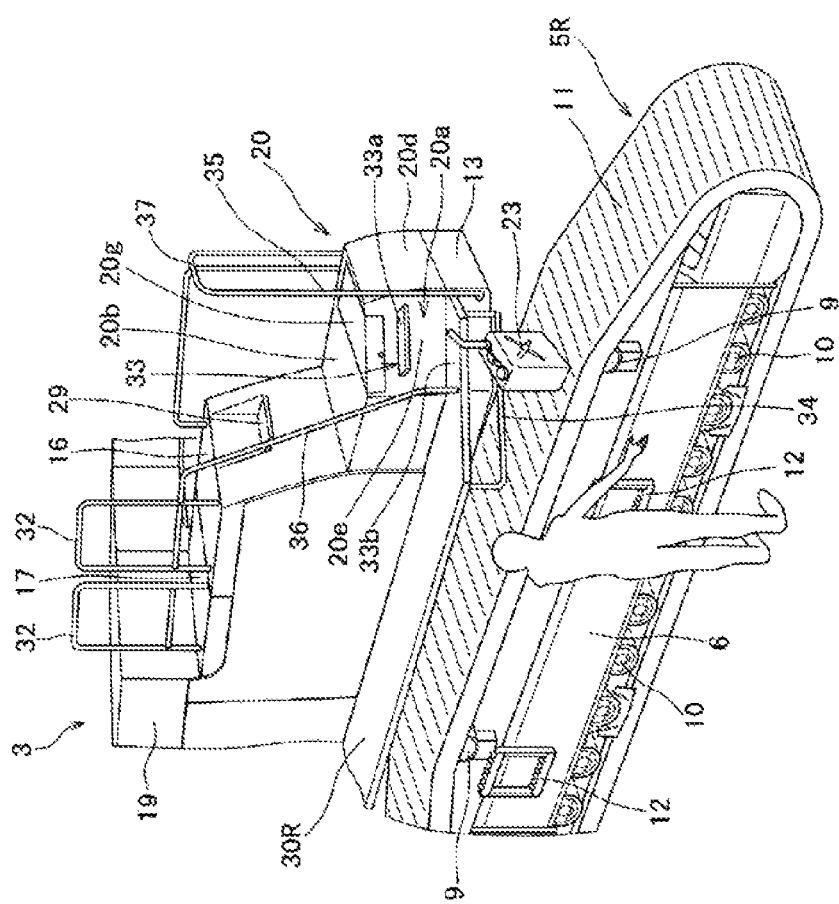
FIG. 6 is a perspective view illustrating the main part showing the second embodiment.

First, the first embodiment of the present invention will be described based on FIG. 1 to FIG. 3. In FIG. 1 to FIG. 3, the reference numeral 1 denotes a hydraulic shovel. The hydraulic shovel 1 is composed of the respective parts such as a crawler-type lower traveling body 2; an upper rotating body 3 rotatably supported at the upper side of the lower traveling body 2; a front work implement 4 attached to the upper rotating body 3 (only a base end portion of the front work machine 4 is shown that is attached to and supported by the upper rotating body 3).

The lower traveling body 2 has a pair of left and right crawler-type running gears 5L and 5R. The respective crawler-type running gears 5L and 5R are configured to include, for example, a track frame 6, a driving sprocket 7, an idler 8, a plurality of upper rollers (carrier rollers) 9, a plurality of lower rollers (track rollers) 10, and a crawler 11. The track frame 6 has a traveling body platform step 12 to allow the worker to step on in order to get on or get off the upper face of the crawler 11 from the ground.

The plurality of upper rollers 9 are provided so that the upper end position is at the upper side of the upper end positions of the driving sprocket 7 and the idler 8. The upper rollers 9 are abutted, from the lower side, to the crawler 11 positioned at the upper side in the middle of the track frame 6 in the front-and-rear direction so as to prevent the crawler 11 from being falling at the middle. The upper face of the crawler 11 of a part supported by these upper rollers 9 (i.e., the upper face of the middle of the crawler 11 in the front-and-rear direction) is substantially horizontal to the ground. On the other hand, a front part that is disconnected from the support by the upper rollers 9 and that is opposed to the idler 8 has the upper face of the crawler 11 downwardly inclined in the front direction. A rear part opposed to the driving sprocket 7 has the upper face of the crawler 11 that is downwardly inclined. In this embodiment, the front-and-rear direction of the crawler 11 is a direction along which the idler 8 is provided at the front side and the driving sprocket 7 is provided at the rear side to connect the idler 8 to the driving sprocket 7. The left-and-right direction of the crawler 11 is a direction orthogonal to the front-and-rear direction. At the inner side of the crawler 11 in the left-and-right direction, the left and right crawler-type running gears 5L and 5R are opposed to each other. The outer side in the left-and-right direction is an opposite side thereof.

On the other hand, the upper rotating body 3 has a rotating frame 13 constituting a supporting structure. The rotating frame 13 is rotatably supported by the lower traveling body 2 via a swing bearing 14. The rotating frame 13 has, at the center of the front side in the left-and-right direction, a base end portion of the front work implement 4 supported to be movable in the upward and downward directions. The upper rotating body 3 also has, while being mounted and supported by the rotating frame 13, a cab 15, a fuel tank 16, a hydraulic oil tank 17, an engine room 18 to store an engine or an exhaust gas treatment apparatus (not shown) for example, a plurality of device rooms 19 to store various apparatuses and devices such as a hydraulic pump or a cooling device (e.g., radiator or oil cooler), as well as a storage box 20 and a counter weight 21 (which will be described later) for example. In this embodiment, the front-and-rear and left-and-right directions of the upper rotating body 3 are the front-and-rear and left-and-right directions seen from an operator sitting in a driver seat (not shown) of the cab 15.

The following section will describe the layout of the respective parts in the upper rotating body 3. The cab 15 is provided at the front side of the left side of the upper rotating body 3. The storage box 20 is provided at the left and right opposite sides of the cab 15 (i.e., the front side of the right side of the upper rotating body 2) so that the cab 15 and the storage box 20 sandwich the base end portion of the front work implement 4. The storage box 20 has, at the rear side thereof, the fuel tank 16 and the hydraulic oil tank 17. The fuel tank 16, the hydraulic oil tank 17, and the cab 15 have, at the rear side thereof, the engine room 18 and a device room 19. At the rear side thereof (at the rear end of the upper rotating body 3), the counter weight 21 is provided. In this embodiment, the front side of the right side of the upper rotating body 2 including the storage box 20 is the front side of one of the left and right sides of the upper rotating body of the present invention. The upper faces of the fuel tank 16, the hydraulic oil tank 17, the engine room 18, the device room 19, and the counter weight 21 as well as a path 22 connecting these upper faces constitute the upper face 3a of the upper rotating body 3 of the present invention. The upper face 3a of the upper rotating body 3 has a height position not limited to the same height position in the entire area. In this embodiment, the upper faces of the fuel tank 16 and the hydraulic oil tank 17 have height positions designed to be one step lower than the height positions of the upper faces of the engine room 18, the device room 19, and the counter weight 21 so as to provide an access between them to the worker.

The storage box 20 forms a storage space to store a urea water tank (not shown) for storing the urea water used in an exhaust gas treatment apparatus, a grease gun, or a tool for example. The storage box 20 is provided at the front side of the right side of the upper rotating body 3 as described above. The storage box 20 has, at the front side of the rear side (the front side of the outer side in the left-and-right direction) thereof, a notch 20a configured, when the front-and-rear direction of the upper rotating body 3 is in the same direction as the front-and-rear direction of the crawler 11, to be obliquely cut from the upper side of the inner end in the left-and-right direction of the crawler 11 of a right crawler running gear 5R to the rear side of the left and right outer sides. Specifically, the storage box 20 is configured to include: a horizontal upper face 20b (that constitutes the upper face of the storage box of the present invention); a left side face (left-and-right inner side face) 20c that is parallel to the front-and-rear direction of the upper rotating body 3 and that is positioned at the left side (or the inner side in the left-and-right direction) of the inner end in the left-and-right direction of the crawler 11; a front face 20d that is parallel to the left-and-right direction of the upper rotating body 3 and that extends from the front end of the left side face 20c in the right direction and the right end thereof (outer side end in the left-and-tight direction) is positioned at the upper side of the inner end in the left-and-right direction of the crawler 11; an inclined face 20e obliquely extending from the right end (outer side end in the left-and-right direction) of the front face 20d to the rear side of the right side (the rear side of the left and right outer sides); and a right side face (outer side face in the left-and-right direction) 20f that is parallel to the front-and-rear direction of the upper rotating body 3 and that extends from the right end (outer side end in the left-and-right direction) of the inclined face 20e in the rear direction. The inclined face 20e forms the notch 20a. The bottom face side of the storage box 20 is mounted to the rotating frame 13 and is covered by the rotating frame 13. The front side of the right side of the rotating frame 13 (the front side of the outer side in the left-and-right direction) at the lower side of the storage box 20 also has a notch obliquely cut from the upper side of the inner end in the left-and-right direction of the crawler 11 to the rear side of the left and right outer sides. This allows the upper face of the crawler 11 at the lower side of the notch 20a of the storage box 20 to be visually confirmed from the upper side. The upper face of the crawler 11 at the lower side of the notch 20a of the storage box 20, including the upper face of the crawler 11 at the outer side in the left-and-right direction of the notch 20a, can be used as a scaffold for a worker or the space S as a temporary storage space for a urea water supply tank 23 or a maintenance tool (not shown) for example. In this case, the upper face of the crawler 11 at the lower side of the notch 20a of the storage box 20 is positioned at the center side in the front-and-rear direction than the upper face of the crawler 11 positioned at the front side than the front face 20d of the storage box 20. Thus, the upper face of the crawler 11 forms the horizontal part described above still supported by the upper roller 9 (or substantially not disconnected from the support by the upper roller 9) and thus can be used as stable scaffold or temporary storage space. The rear face side of the storage box 20 is covered by the front face of the fuel tank 16 provided at the rear side of the storage box 20.

The inclined face 20e forming the notch 20a of the storage box 20 is provided so as to obliquely extend, as described above, from the right end (outer side end in the left-and-right direction) of the front face 20d to the rear side of the right side (the rear side of the left and right outer sides). The right end of the front face 20d is positioned at the upper side of the inner end in the left-and-right direction of the crawler 11. Specifically, the notch 20a of the storage box 20 is provided only at a part positioned at the upper side of the upper face of the crawler 11. Thus, no notch is provided at parts at the inner side than the crawler 11 in the left-and-right direction, thus minimizing the reduced capacity of the storage box 20 due to the existence of the notch 20a. The front face 20d has a headlight (not shown) to illuminate the front side of the machine body. In this case, the front face 20d provided to be parallel to the left-and-right direction of the upper rotating body 3 can eliminate the need for the angle adjustment of the headlight in the left-and-right direction, thus providing a simpler structure to attach the headlight.

The upper face 20b of the storage box 20 has a smaller height than that of the upper face of the fuel tank 16 provided at the rear side of the storage box 20. Thus, the upper face 20b of the storage box 20 can be used as a platform path from the ground to the upper face 3a of the upper rotating body 3 or as a workshop (e.g., a workshop for the maintenance operation of the fuel tank 16). At least a part of the upper face 20b of the storage box 20 is composed of a lid 20g that can be opened or closed. By opening the lid 20g, the supply operation to the urea water tank stored in the storage box 20 can be performed or a tool for example stored in the storage box 20 can be accessed. The lid 20g can be opened or closed by the worker on the upper face of the crawler 11 at the lower side of the notch 20a described above.

Next, the following section will describe a structure in which a path from the ground to the upper face 20b of the storage box 20 is used to allow the worker to get on or get off the upper face 3a of the upper rotating body 3. The storage box 20 has a right side face (outer side face in the left-and-right direction) 20f on which the lower ends of the first hand rail 25 and the second hand rail 26 are fixedly supported and a storage box platform step 27 (which corresponds to the platform scaffold of the present invention) is provided. The right side face 20f of the storage box 20 has, at the lower side thereof, the rotating frame 13 attached with a pair of left and right grips 28. A tank platform step 29 is provided on the front face of the fuel tank 16 provided at the lower side of the storage box 20.

The pair of left and right grips 28 are used, by being gripped, to step on the traveling body platform step 12 provided on the track frame 6 of the lower traveling body 2 to get on the upper face of the crawler 11. The grip 28 is configured so that an attachment unit 28a consisting of steel material is attached to the rotating frame 13 and a grip unit 28b fixed to the attachment unit 28a is formed by elastic material such as rubber. This configuration can prevent, even if the grip unit 28b collides with an obstacle for example during the rotation, the grip unit 28b or the obstacle from being broken.

The storage box platform step 27 is used to step on in order to get on the upper face 20b of the storage box 20 from the upper face of the crawler 11. The storage box platform step 27 is composed of an upper step 27a fixed to the right side face 20f of the storage box 20 and a lower step 27c hanged from the upper step 27a via a string-like body 27b. By hanging the storage box platform step 27 provided on the right side face 20f of the storage box 20 as described above, even when the lower step 27c may collide with an obstacle for example during the rotation for example, the lower step 27c or the obstacle can be prevented from being broken. Furthermore, the lower step 27c is provided to be positioned at the rotating frame 13 at the lower side of the right side face 20f the storage box 20. In this case, the lower step 27c is provided so as to have substantially the same height position as that of a right catwalk 30R provided in the right side face of the rotating frame 13 and to be abutted to the front end of the right catwalk 30R as described later.

The first hand rail 25 and the second hand rail 26 are provided at both sides of the storage box platform step 27 so as to be gripped by the worker when the worker get on the upper face 20b of the storage box 20 from the upper face of the crawler 11. The first hand rail 25 has a lower end fixedly supported by the right side face 20f of the storage box 20 and has an upper end further extending from the upper face 20b of the storage box 20 to be connected to a guide rail 31 provided on the upper face 20h of the storage box 20. The second hand rail 26 has an lower end fixedly supported by the right side face 20f of the storage box 20 and has an upper end fixed to the upper face of the fuel tank 16. Thus, the second hand rail 26 also can be gripped when the worker gets on the upper face of the fuel tank 16 from the upper face 20b of the storage box 20.

The tank platform step 29 is used to step on the upper face 3a of the upper rotating body 3 from the upper face 20b of the storage box 20. The tank platform step 29 is attached to the front face of the fuel tank 16 provided at the rear side of the storage box 20 as described above. In the drawing, the reference numeral 32 denotes a guide rail provided at the upper face 3a of the upper rotating body 3. The upper face 3a of the upper rotating body 3 and the guide rails 32 and 31 provided at the upper face 20b of the storage box 20 prevent the worker from falling and can be used as a handrail for the worker and also can be used as a device support stay for a lighting device or an antenna (not shown).

Thus, when a worker gets on the upper face 3a of the upper rotating body 3 from the ground, the worker can use, as a platform from the ground to the upper face of the crawler 11, a traveling body platform step 12 provided at the track frame 6 of the lower traveling body 2 and the left and right grips 28 provided at the rotating frame 13. A platform from the upper face of the crawler 11 to the upper face 20b of the storage box 20 is composed of a storage box platform step 27 attached to the right side face 20f of the storage box 20 as well as the first hand rail 25 and the second hand rail 26 provided at both sides of the storage box platform step 27. A platform from the upper face 20b of the storage box 20 to the upper face 3a of the upper rotating body 3 is composed of the tank platform step 29 provided at the front face of the fuel tank 16 provided at the rear side of the storage box 20 and the second hand rail 26.

On the other hand, the rotating frame 13 has the outer side face in the left-and-right direction that has left and right catwalks 30L and 30R extending in the front-and-rear direction. The catwalks 30L and 30R are used as a workshop to allow the worker to perform a maintenance operation on a device stored in the device room 19 provided in the upper rotating body 3 or are used as a scaffold to allow the worker to move on the upper rotating body 3 in the front-and-rear direction. The right catwalk 30R has the front end provided to reach the rear end of the right side face 20f of the storage box 20. The right side face 20f of the storage box 20 has the lower step 27c of the storage box platform step 27 that has substantially the same height position as that of the right catwalk 30R and that is provided to be abutted to the front end of the right catwalk 30R. Specifically, the lower step 27c of the storage box platform step 27 and the right catwalk 30R are continuous so that an access therebetween can be easily obtained. This configuration allows the worker to get on the right catwalk 30R from the ground, from the catwalk 30 to the upper face 20b of the storage box 20, or to the upper face 3a of the upper rotating body 3 in an easy and efficient manner. In this embodiment, the right catwalk 30R corresponds to a catwalk provided in an outer side face at one of the left and right sides of the upper rotating body of the present invention.

In the first embodiment configured as described above, the hydraulic shovel 1 includes the lower traveling body 2 having left and right crawlers 11, the upper rotating body 3 that constitutes a rotating frame 13 constituting a supporting structure and that is rotatably supported by the lower traveling body 2, and the storage box 20 provided at the front side of the right side of the upper rotating body 3. The upper face 20b of the storage box 20 can be used as a platform path to allow the worker to get on the upper face 3a of the upper rotating body 3 from the ground. In the first embodiment, the storage box 20 and the storage box 20 have, at the lower side thereof, the front side of the right side of the rotating frame 13 (the front side of the outer side in the left-and-right direction) that has the notch 20a. The notch 20a is configured, when the front-and-rear direction of the upper rotating body 3 is in the same direction as the front-and-rear direction of the crawler 11, to be obliquely cut from the upper position of the inner end in the left-and-right direction of the right crawler 11 to the rear side of the left and right outer sides. The notch 20a has, at the lower side thereof, the upper face of the crawler 11 that is secured as a space S usable as a scaffold for a worker or as a temporary storage space for the supply tank 23 or a maintenance tool for example. Furthermore, the storage box 20 is configured to include the front face 20d that is parallel to the left-and-right direction of upper rotating body 2 and that has a right end (outer side end in the left-and-right direction) provided at the upper side of the crawler 11 in the inner end in the left-and-right direction; the inclined face 20e that is obliquely extends from the right end of the front face 20d (outer side end in the left-and-right direction) to the rear side of the right side (the rear side of the left and right outer sides) to form the notch 20a; and the right side face (outer side face in the left-and-right direction) 20f that is parallel to the front-and-rear direction of the upper rotating body 2 and that extends from the right end of the inclined face 20e (outer side end in the left-and-right direction) in the rearward direction. The right side face 20f of the storage box 20 and the rotating frame 13 positioned at the rear side of the right side face 20f have the storage box platform step 27 (the upper step 27a and the lower step 27c) used as a platform scaffold to the upper face 20b of the storage box 20.

Thus, the upper face of the crawler 11 at the lower side of the notch 20a of the storage box 20 can be used as a scaffold for a worker or as a temporary storage space. In this case, the upper face of the crawler 11 at the lower side of the notch 20a of the storage box 20 is positioned at the center side in the front-and-rear direction than the upper face of the crawler 11 positioned at the front side of the front face 20d of the storage box 20 so as to be horizontal. Thus, the upper face of the crawler 11 at the lower side of the notch 20a of the storage box 20 can be used as stable scaffold or temporary storage space.

Furthermore, the notch 20a of the storage box 20 is obliquely cut from the upper side of the crawler 11 in the inner end in the left-and-right direction to the rear side of the left and right outer sides. Thus, no notch is provided at parts at the inner side than the crawler 11 in the left-and-right direction, thus minimizing the reduced capacity of the storage box 20 due to the existence of the notch 20a. Furthermore, at the inner side of the crawler 11 in the left-and-right direction, the front face 20d can be provided that is parallel to the left-and-right direction of the upper rotating body 2, thus providing a simpler structure to attach a headlight to the front face 20d.

Furthermore, the right side face 20f of the storage box 20 and the rotating frame 13 positioned at the lower side of the right side face 20f have the storage box platform step 27 (the upper step 27a and the lower step 27c) that can be used as a platform scaffold to get on the upper face 20b of the storage box 20. Thus, the worker can get on the upper face 20b of the storage box 20 without stepping on the inclined upper face of crawler 11 positioned at the front side of the front face 20d of the storage box 20, thus providing more stable stepping.

Also according to the first embodiment, the right side face 20f of the storage box 20 has, at the lower side thereof, the lower step 27c provided in the rotating frame 13 that is provided to be continuous with the right catwalk 30R provided at the outer side face at the right side of the upper rotating body 2. Thus, the worker can move between the catwalk 30 and the upper face 20b of the storage box 20 or between the catwalk 30 and the upper face 3a of the upper rotating body 3 in an easy and efficient manner.

Next, the following section will describe the second embodiment of the present invention with reference to FIG. 1 to FIG. 6. The second embodiment has a similar layout in the upper rotating body 3 of the cab 15, the fuel tank 16, the hydraulic oil tank 17, the engine room 18, the device room 19, the storage box 20, and the counter weight 21 for example as that of the first embodiment. Furthermore, the storage box 20 and the front side of the right side of the rotating frame 13 (the front side of the outer side in the left-and-right direction) at the lower side of the storage box 20 have the notch 20a obliquely cut from the upper side of the crawler 11 in the inner end in the left-and-right direction to the rear side of the left and right outer sides. The storage box 20 is configured, as in the first embodiment, the upper face 20b, the left side face 20c (inner side face in the left-and-right direction), the front face 20d, the inclined face 20e forming the notch 20a, and the right side face 20f (outer side face in the left-and-right direction). As in the first embodiment, the upper face of the crawler 11 at the lower side of the notch 20a also can be used as the space S for a scaffold for a worker or as a temporary storage space. Thus, the second embodiment is similar to the first embodiment in that the upper face of the crawler 11 at the lower side of the notch 20a of the storage box 20 can be used as stable scaffold or temporary storage space. Furthermore, the reduced capacity of the storage box 20 due to the existence of the notch 20a can be minimized, thus providing actions and effects as in the first embodiment. In the second embodiment, the common components as those of the first embodiment will be denoted with the same reference numerals and will not be further described.

Furthermore, the second embodiment is similar to the first embodiment in that the upper face 20b of the storage box 20 can be used as a platform path to get on the upper face 3a of the upper rotating body 3 from the ground or as a workshop. According to the second embodiment, an upper step 33a fixed to the inclined face 20e of the storage box 20 and a scaffold plate 33b (which will be described later) are provided as an storage box platform step 33 (corresponding to a platform scaffold of the present invention) to allow the worker to get on the upper face 20b of the storage box 20 from the upper face of the crawler 11.

The scaffold plate 33b is provided at the rotating frame 13 at the lower side of the inclined face 20e and the right side face 20f (outer side face in the left-and-right direction) of the storage box 20 and is formed to extend from the front end of right catwalk 30R in an integrated manner to be continuous with the right catwalk 30R. Furthermore, an edge of the scaffold plate 33b at the outer side in the left-and-right direction is formed toward the rear side of the left and right outer sides so to obliquely extend from a part positioned at the lower side of the inclined face 20e to a part positioned at the lower side of the right side face 20f (outer side face in the left-and-right direction). This configuration can increase the space S of the upper face of the crawler 11 formed by the notch 20a of the storage box 20.

The lower face of the scaffold plate 33b is attached with a lower hand rail 34. The lower hand rail 34 is gripped by a worker when the worker steps on the traveling body platform step 12 from the ground to get on the upper face of the crawler 11. The lower hand rail 34 is provided to extend along an inclined outer edge in the left-and-right direction of the scaffold plate 33b.

The reference numerals 35 and 36 denote the first and second hand rails provided at both sides of the storage box platform step 33. The first hand rail 35 and the second hand rail 36 are gripped by a worker when the worker gets on the upper face 20b of the storage box 20 from the upper face of the crawler 11. The first hand rail 35 has a lower end fixedly supported by the rotating frame 13 and has an upper end that further upwardly extends from the upper face 20b of the storage box 20 to be connected to the guide rail 37 guarding the front side of the upper side of the upper face 20b of the storage box 20. The second hand rail 36 has a lower end fixedly supported by the scaffold plate 33b and has an upper end fixed to the upper face of the fuel tank 16 so that the second hand rail 36 also can be gripped when the worker gets on the second hand rail 36 of the fuel tank 16 from the upper face 20b of the storage box 20.

Thus, according to the second embodiment, when a worker gets on the upper face 3a of the upper rotating body 3 from the ground, the worker can get on the upper face of the crawler 11 form the ground by using the traveling body platform step 12 provided at the track frame 6 of the lower traveling body 2 and the lower hand rail 34 provided at the lower face side of the scaffold plate 33b. When the worker gets on the upper face 20b of the storage box 20 from the upper face of the crawler 11, the worker can the storage box platform step 33 and the first hand rail 35 and the second hand rail 36. The storage box platform step 33 consists of the inclined face 20e of the storage box 20, the scaffold plate 33b attached to the rotating frame 13 at the lower side of the right side face 20f (outer side face in the left-and-right direction), and the upper step 33a attached to the inclined face 20e. The first hand rail 35 and the second hand rail 36 are provided at both sides of the storage box platform step 33. When the worker gets on the upper face 3a of the upper rotating body 3 from the upper face 20b of the storage box 20, the worker can use, as in the first embodiment, the tank platform step 29 provided at the front face of the fuel tank 16 provided at the lower side of the storage box 20 and the second hand rail 36.

According to the second embodiment having the configuration as described above, the storage box platform step 33 is composed of the scaffold plate 33b attached to the rotating frame 13 provided at the lower side of the inclined face 20e of the storage box 20 and the right side face 20f (outer side face in the left-and-right direction) and the upper step 33a attached to the inclined face 20e of the storage box 20. The scaffold plate 33b and the scaffold plate 33b can be used as a platform scaffold to allow a worker to get on the upper face 20b of the storage box 20. Thus, the second embodiment also can allow the worker to get on the upper face 20b of the storage box 20 without stepping on the inclined upper face of the crawler 11 positioned at the front side of the front face 20d of the storage box 20, thus providing more stable stepping.

Also according to the second embodiment, the scaffold plate 33b constituting the storage box platform step 33 is formed to extend from the front end of the right catwalk 30R. Thus, the second embodiment also can allow the worker to get on the right catwalk 30R from the ground and to get on the upper face 20b of the storage box 20 from the right catwalk 30R and to get on the upper face 3a of the upper rotating body 3 in an easy and efficient manner.

The present invention is not limited to the first and second embodiments. In the first and second embodiments, a cab is provided at the front side of the left side of the upper rotating body and a storage box is provided at an opposite side of the cab in the left-and-right direction (the front side of the right side of the upper rotating body) for example. However, a cab also may be provided at the front side of the right side of the upper rotating body. In this case, the storage box is provided at the front side of the left side of the upper rotating body. The platform scaffold provided at the rotating frame positioned at the lower side of the storage box is configured so as to be continuous with a left catwalk and thus is symmetrically identical to the first and second embodiments in the left-and-right direction. The layout of the hydraulic oil tank, the fuel tank, the engine room, and the device room for example in the upper rotating body is not limited to those of the first and second embodiments and may be appropriately designed depending on the type or size of the hydraulic shovel for example.

Also according to the second embodiment, the platform scaffold (storage box platform step 33) used to get on the upper face of the storage box from the upper face of the crawler is composed of an upper step and a scaffold plate. However, the scaffold plate also may be substituted with a lower step similar to the upper step. In this case, the lower step is provided at the rotating frame at the lower side of the inclined face of the storage box. The front end of the catwalk is formed to extend to the rear end of the inclined face. This configuration allows the lower step and the catwalk to be continuous.

INDUSTRIAL APPLICABILITY

The present invention can be applied to a hydraulic shovel including a crawler-type lower traveling body in which a storage box is provided at the front side at one side of the upper rotating body in the left-and-right direction.

REFERENCE SIGNS LIST 1 hydraulic shovel
2 lower traveling body
3 upper rotating body
11 crawler
13 rotating frame
20 storage box
20a notch
20b upper face
20d front face
20e inclined face
20f right side face
27 storage box platform step
30R right catwalk
33 storage box platform step

What is claimed is:

1. A hydraulic shovel, comprising: a lower traveling body having a left crawler and a right crawler for supporting the hydraulic shovel on a ground surface; an upper rotating body that has a rotating frame constituting a supporting structure and that is rotatably supported by the lower traveling body; and a storage box provided at a front side of one of a left side and a right side of the upper rotating body, characterized in that: an upper face of the storage box can be used as a platform path to get on an upper face of the upper rotating body from the ground when the upper rotating body is in the same direction as the crawler, the storage box includes a front face that is parallel to a direction perpendicular to a longitudinal direction of the upper rotating body and has an outer side end positioned at an upper side of the crawler at a portion of a track of the crawler that is supported by an upper roller and is substantially horizontal to the ground surface, an inclined face obliquely extending in a rearward direction above the track from the outer side end of the front face to an outer side face of the storage box to form a notch, and the outer side face is parallel to the longitudinal direction of the upper rotating body and that extends above the track, and the notch is configured to support a standing worker or an object placed by a worker when the portion of track is adjacent to the notch.

2. The hydraulic shovel according to claim 1, characterized in that: an outer side face of one of a left side or a right side of the upper rotating body has a catwalk extending in the longitudinal direction and a platform scaffold is positioned at a lower side of the inclined face or the outer side face of the storage box so that the platform scaffold is continuous with the catwalk.

3. The hydraulic shovel according to claim 1, in which a platform scaffold to get on or get off the upper face of the storage box is provided and positioned at the inclined face.

4. The hydraulic shovel according to claim 1, in which a platform scaffold to get on or get off the upper face of the storage box is provided and positioned at the a lower side of the inclined face.

5. The hydraulic shovel according to claim 1, in which a platform scaffold to get on or get off the upper face of the storage box is provided and positioned at the outer side face.

* * * * *